US009592859B1

(12) United States Patent
Dewitt et al.

(10) Patent No.: US 9,592,859 B1
(45) Date of Patent: Mar. 14, 2017

(54) TRAILER WITH LOWER LEVEL LOAD SPACE AND UPPER LEVEL LIVING QUARTERS

(71) Applicants: Keith D. Dewitt, Riverview, FL (US); Patricia P. Dewitt, Riverview, FL (US)

(72) Inventors: Keith D. Dewitt, Riverview, FL (US); Patricia P. Dewitt, Riverview, FL (US)

(*) Notice: Subject to any disclaimer, the term of this patent is extended or adjusted under 35 U.S.C. 154(b) by 0 days.

(21) Appl. No.: 14/863,910

(22) Filed: Sep. 24, 2015

Related U.S. Application Data

(60) Provisional application No. 62/061,226, filed on Oct. 8, 2014.

(51) Int. Cl.
B60P 3/32 (2006.01)
B62D 31/04 (2006.01)
B60J 7/16 (2006.01)
B60P 3/04 (2006.01)

(52) U.S. Cl.
CPC ............ B62D 31/04 (2013.01); B60J 7/1635 (2013.01); B60P 3/32 (2013.01)

(58) Field of Classification Search
CPC .................................. B60P 3/04; B61D 3/163
USPC ....... 296/24.31, 24.3, 100.06, 100.1, 100.07, 296/101, 40
See application file for complete search history.

(56) References Cited

U.S. PATENT DOCUMENTS

| | | | | |
|---|---|---|---|---|
| 1,379,695 A | * | 5/1921 | Rochlis | B65F 3/00 296/101 |
| 2,551,239 A | * | 5/1951 | Bond | B60J 7/141 296/100.1 |
| 2,739,833 A | | 9/1956 | Schenkel | |
| 2,862,253 A | | 12/1958 | Place et al. | |
| 2,862,759 A | | 12/1958 | Huth | |
| 3,515,426 A | | 6/1970 | Gerber | |
| 3,612,589 A | | 10/1971 | Locher, Jr. | |
| 3,617,086 A | | 11/1971 | King | |
| 3,774,956 A | | 11/1973 | Barlow | |
| 5,374,094 A | | 12/1994 | Smith et al. | |
| 6,283,537 B1 | | 9/2001 | DeVore, III | |
| 6,302,475 B1 | | 10/2001 | Anderson | |
| 7,004,525 B1 | * | 2/2006 | Turnbow | B60P 3/32 296/24.31 |
| 7,273,245 B2 | | 9/2007 | Ray | |
| 2011/0278877 A1 | | 11/2011 | Kim | |

* cited by examiner

Primary Examiner — Dennis H Pedder
(74) Attorney, Agent, or Firm — H. John Rizvi; Gold & Rizvi, P.A.

(57) ABSTRACT

A multipurpose trailer including a trailer structure, a wheel assembly and a hitch assembly is disclosed, wherein the lower level includes a first cargo space such as for containing and transporting livestock. An upper level is located above the lower level, and includes a second cargo space adapted and constructed to provide, for instance, living space for humans. A roof assembly is connected to the upper level, whereby the roof assembly is convertible between a first, closed position in which the roof assembly is folded over the second cargo space of the upper level, and a second, open position in which the roof assembly is open to the ambient environment.

12 Claims, 6 Drawing Sheets

TRAILER WITH LOWER LEVEL LOAD SPACE AND UPPER LEVEL LIVING QUARTERS

FIELD OF THE INVENTION

This application claims the benefit of U.S. Provisional Patent Application Ser. No. 62/061,226, filed Oct. 8, 2014, which is incorporated herein in its entirety.

FIELD OF THE INVENTION

The present invention relates generally to multi-purpose vehicles, and more particularly, to a vehicle in the form of a trailer having multiple levels and dedicated spaces designed respectively for storage of items or animals, and for housing humans.

BACKGROUND OF THE INVENTION

Although the origins of wheeled vehicles are not precisely known, it is clear that they were first developed in the form of trailers, i.e., vehicles transported by towing. The earliest vehicles were towed by humans or animals, and were used to enhance capacity (by moving more goods or material than could be carried by one person or animal) or speed (e.g., carts or chariots used in battle). The first known trailers providing living space for human occupants appeared in France in the early 19$^{th}$ Century, and were used to house and transport circus performers. Around 1850, similar trailers evolved into the vardo or caravan used by the Romani people.

Although the materials used in manufacturing modern trailers have changed throughout time, trailers are still typically built for specific uses, such as for hauling goods or to provide at-hand shelter. Some trailers are convertible between these two main purposes. Such trailers require time, effort, and extra hardware to change from a load-transportation trailer to a utility or travel trailer. Further, once configured for one specific function, convertible trailers are then fixed in that functionality for the duration of the trailer trip.

Other known trailers are fitted out as dual-purpose trailers, with space dedicated to both carrying goods and providing shelter. Dual-purpose trailers are conventionally designed to provide living space at one end, and transport/storage space at the opposite end. These arrangements necessarily increase the size and weight of the trailer, thus increasing the difficulty and expense of towing.

Unfortunately, known trailers are either limited in their functionality, cumbersome to convert from one function to another, or excessively large and expensive to build and operate.

Accordingly, there remains a need in the art for a multifunctional trailer that is economical to manufacture, easy to operate, and provides ample storage and transport space along with an enhanced living experience for human occupants.

SUMMARY OF THE INVENTION

The present invention is directed to a multipurpose trailer including an upper level, adapted to provide, for instance and without limitation, living space for humans, and a lower level arranged beneath the upper level and adapted and constructed to contain and transport, for instance and without limitation, live or non-live cargo.

In a first aspect of the invention, a multipurpose trailer comprises a trailer structure, a wheel assembly rotatable with respect to the trailer structure, and a hitch assembly for coupling the trailer structure to a vehicle. The trailer structure includes a lower level comprising a first cargo space, and an upper level located above the lower level, the upper level comprising a second cargo space. The trailer structure further includes a roof assembly connected to the upper level. The roof assembly is selectively convertible between a first, closed position in which the roof assembly is folded over the second cargo space of the upper level, and a second, open position in which the roof assembly is open communicating the second cargo space with an ambient environment of the trailer structure. Such a trailer configuration provides two separate cargo areas at different levels, as well as a very satisfying user experience offered by the moving roof.

In a second aspect, the hitch assembly can be disposed within a hitch mechanism receiving space arranged forward to the first cargo space of the lower level, and the second cargo space of the upper level can be arranged above the hitch mechanism receiving space and the first cargo space of the lower level. Such arrangements make efficient use of otherwise free space above a hitch mechanism, maximizing the overall cargo space for a specific trailer length and height.

In another aspect, the multipurpose trailer can further include an inner access between the lower level and the upper level, to facilitate humans moving from one level to the other and thus making complete use of the multipurpose trailer. For instance and without limitation, the inner access between the lower level and the upper level can be provided as any one of a staircase, a ladder and an elevator.

In yet another aspect, the multipurpose trailer can further include a first access for entering the first cargo space of the lower level from outside the trailer structure, and a second access for entering a landing area from outside the trailer structure, the landing area being arranged within the trailer structure at the lower level. The second cargo space of the upper level can be accessible from the landing area by using the inner access between the lower level and the upper level (e.g., a staircase, a ladder or an elevator). Having two separate accesses minimizes interaction between humans utilizing the second cargo space and live or non-live cargo occupying the first cargo space, thus contributing to maintain the trailer well organized and in optimum hygienic condition.

In another aspect, the first access and the second access can be arranged on different sidewalls of the trailer structure, to further contribute to minimize interaction between the first cargo space and the second cargo space.

In another aspect, the landing area and the first cargo space of the lower level can be isolated by an inner wall of the trailer structure, further separating the first cargo space from the second cargo space.

In yet another aspect, the second cargo space of the upper level can be provided with at least one of a kitchen facility, a bathroom facility, furniture and an electronic device, for human use.

In another aspect, the roof assembly can be constructed at least partially from a translucent material, to allow natural light to penetrate the second cargo space in the upper level.

In another aspect, wherein the roof assembly is constructed at least partially from a transparent material, to allow natural light to penetrate the second cargo space in the upper level and also allow to see-through the roof assembly from the second cargo space.

In another aspect, the roof assembly can be constructed at least partially from an opaque material, to prevent light from entering the second cargo space.

In yet another aspect, the roof assembly can be constructed at least partially from a screen material, to allow air to flow to and from the second cargo space while preventing insects from entering the second cargo space.

In another aspect, the roof assembly can include two roof sections, each roof section hinged to an opposite lateral sidewall of the trailer structure. The roof sections can meet along an upper longitudinal section when the roof assembly is arranged in the first, closed position. Such a configuration allows the roof assembly to be formed by a small amount of relatively small-sized parts, which greatly facilitates construction of the roof assembly at reasonable cost.

In another aspect, the upper longitudinal section can span from a rear wall of the trailer structure to a front wall of the trailer structure, to maximize the roof opening when the roof assembly is in the second, open position.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a multipurpose trailer including a lower level adapted and constructed to contain and transport load in general; in the depicted embodiment, the lower level is particularly adapted and constructed to transport horses or other animals. An upper level is located above the lower level, and is adapted and constructed to provide living space for humans. A roof assembly is connected to the upper level, whereby the roof assembly is convertible between a first, closed position in which the roof assembly is folded over the living space of the upper level, and a second, open position in which the roof assembly is open to the ambient environment.

Figure 1:
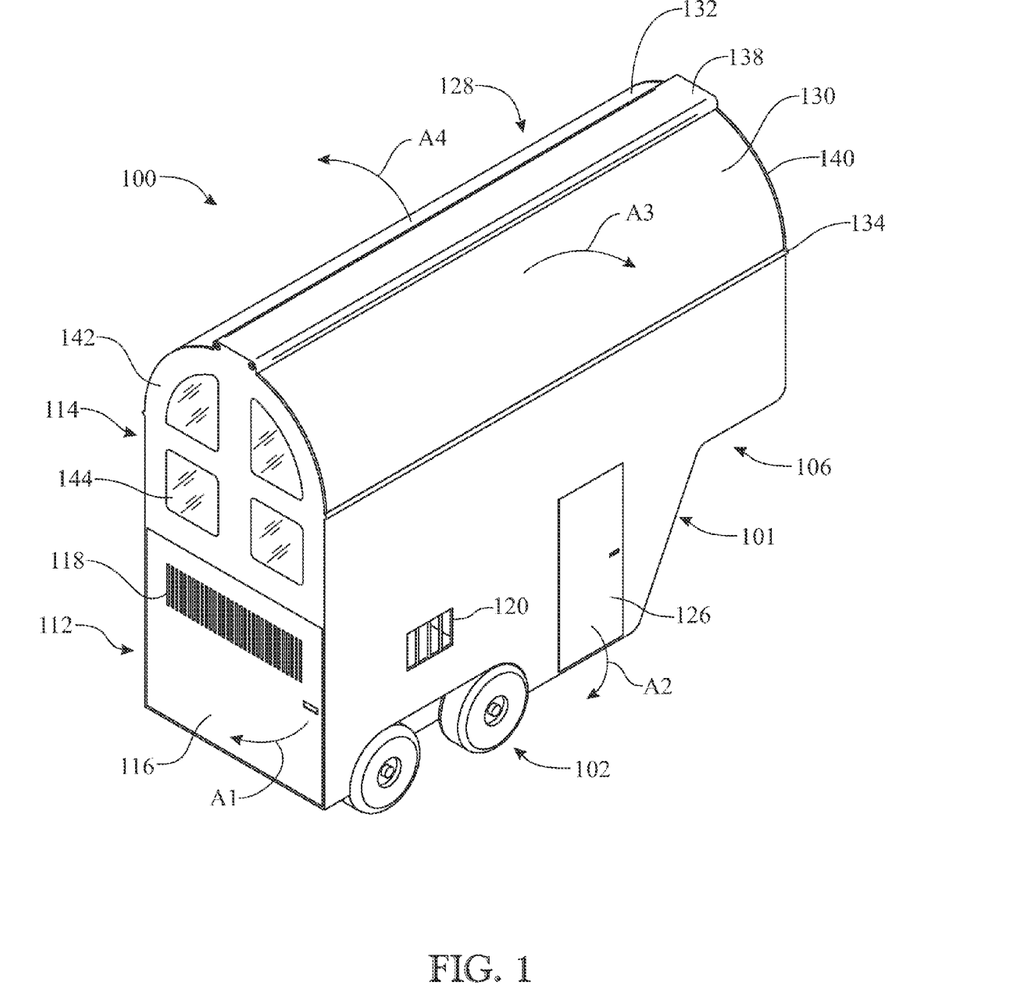
FIG. 1 presents a top rear isometric view of an exemplary trailer in accordance with the invention, shown in a closed position.
Figure 3:
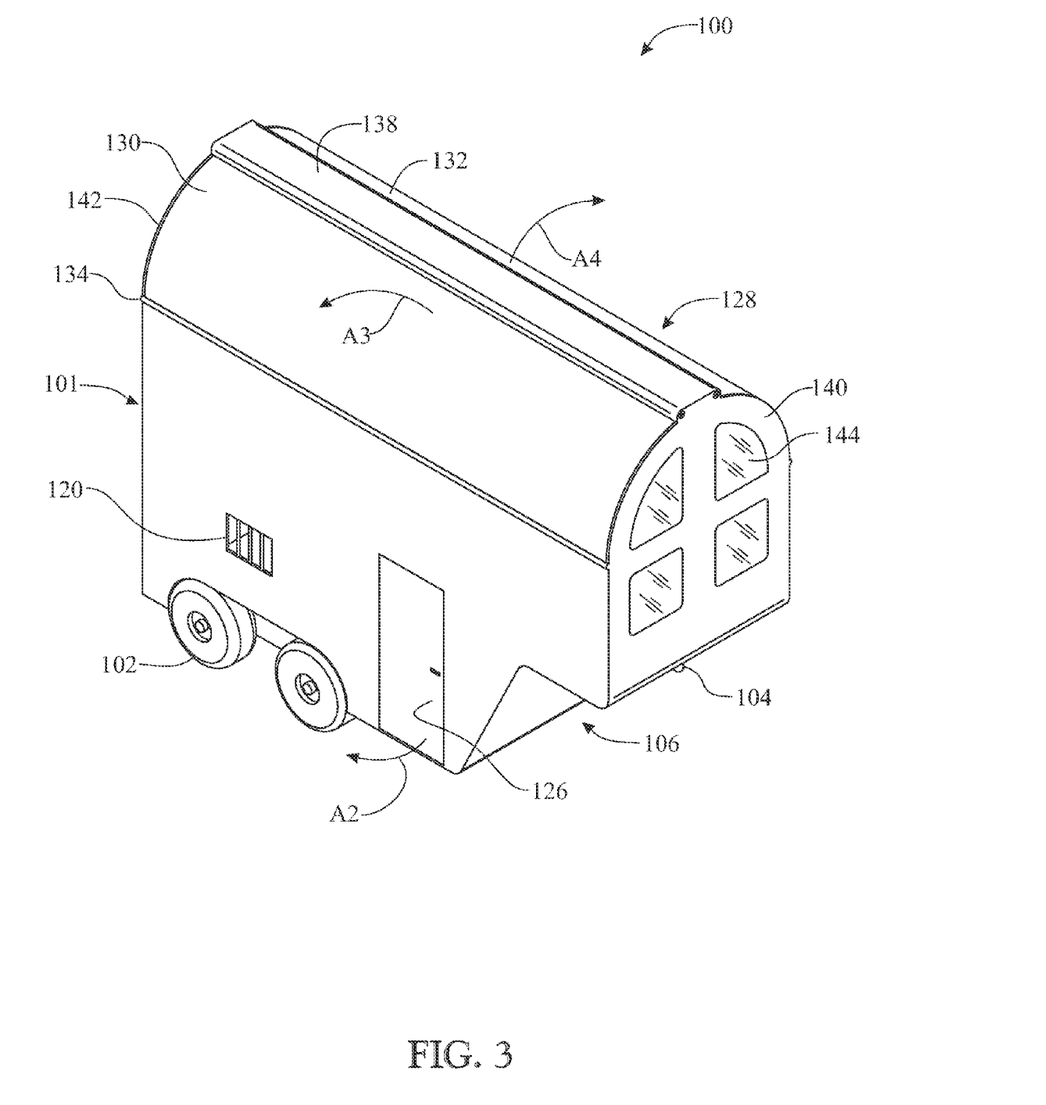
FIG. 3 presents a top front isometric view of the trailer of FIG. 1.

Referring initially to FIGS. 1 and 3, a multipurpose trailer 100 is depicted, including wheel assembly 102 and hitch mechanism 104. The hitch mechanism 104 is arranged at a hitch mechanism receiving space 106, and allows attaching the trailer 100 to a vehicle hitch receiver (not shown). Although the multipurpose trailer 100 is illustrated herein in a fifth wheel configuration, it is contemplated that the principles of the present invention could be applied to any suitable trailer or RV arrangement.

Figure 6:
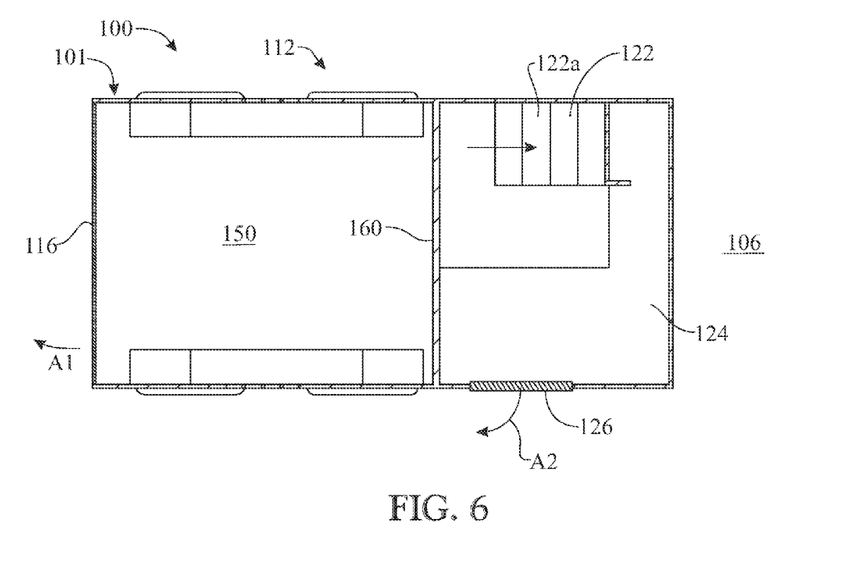
FIG. 6 presents a cross-sectional top plan view of the trailer of FIG. 1, according to sectional plane 6-6 indicated in FIG. 2.

The multipurpose trailer 100 includes a main body or structure 101 having a lower level 112 and an upper level 114. The lower level 112 of the present embodiment is adapted and constructed to contain and transport livestock and/or cargo, and particularly horses. As shown in FIG. 6, depicting a cross-sectional top plan view of the trailer 100 at lower level 112, the lower level 112 defines a storage space 150 for those or any other suitable purposes. Toward the end, access to the interior storage space 150 of the lower level 112 is provided from the outside by means of a hinged loading door 116. The loading door 116 is openable in the direction of arrow A1 (FIGS. 1 and 6) to facilitate loading and unloading of livestock and cargo. As best shown in FIG. 1, light and ventilation to the storage space 150 of the lower level 112 are provided by a vent aperture 118 in the door 116, and a vent aperture 120 in a side wall of the lower level 112.

Figure 7:
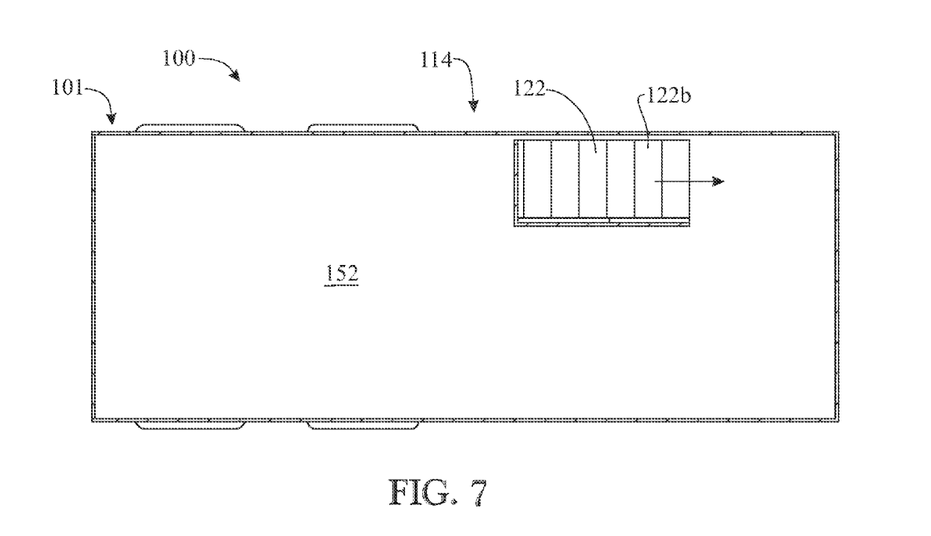
FIG. 7 presents a cross-sectional top plan view of the trailer of FIG. 1, according to sectional plane 7-7 indicated in FIG. 2.

The upper level 114 of the multipurpose trailer 100 is located above the lower level 112. As best shown in FIG. 7, depicting a cross-sectional top plan view of the trailer 100 at upper level 114, an access structure is provided in order for occupants to have a way of moving between the upper level 114 and the lower level 112; in the present embodiment, the access structure is a staircase 122, a bottom portion 122a of which is arranged at the lower level 112 (FIG. 6) and a top portion 122b of which is arranged at the upper level 114 (FIG. 7). Although the access structure is shown as a staircase 122, it is also contemplated that the access structure could be provided as a ladder, elevator, or any suitable bi-level access mechanism.

With continued reference to FIG. 7, the upper level 114 of the multipurpose trailer 100 provides living space 152 for human occupation. The living space 152 can include any suitable facilities for accommodating humans, such as furniture, a kitchenette, toilet facilities, entertainment electronics, and the like. The multipurpose trailer 100 can incorporate a climate control system to keep the living quarters, and optionally the load space, at desired temperature and humidity levels. The climate control system may be switched on and off manually by a user, and/or controlled by a suitable automatic thermostat.

As shown in FIG. 6, the bottom portion 122a of the staircase 122 ends in a landing area 124 in the lower level 112 of the multipurpose trailer 100. Access to the landing area 124 is available through a door 126 formed in a side wall of the trailer 100. The door 126 opens outwardly in the direction of arrow A2. In addition to providing a space for the staircase 112, the landing area 124 can also be used for other purposes as needed. For example, the landing area 112 can be employed as auxiliary storage area, as a kitchen area, as a portable toilet area, or as a locus for climate control or electronics equipment.

Figure 4:
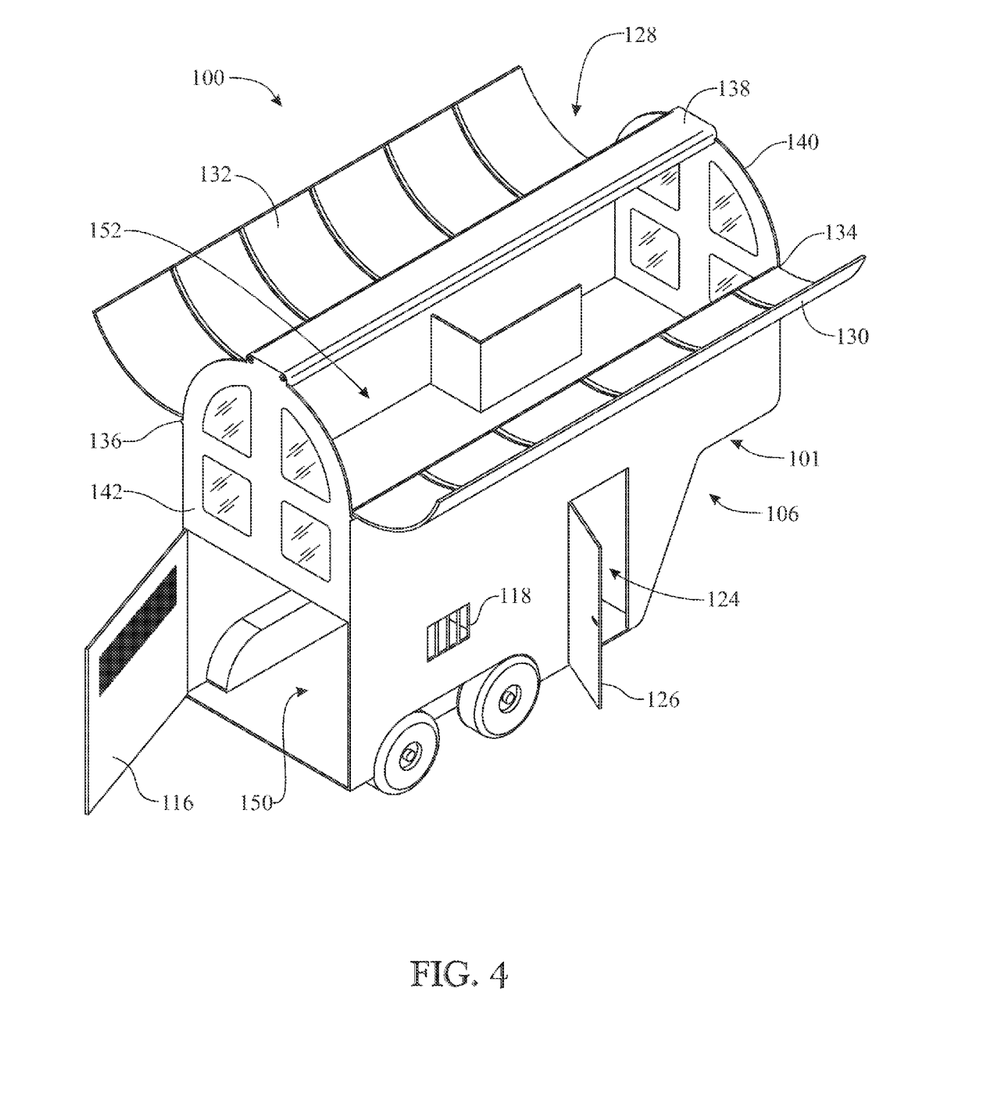
FIG. 4 presents a top rear isometric view of the trailer of FIG. 1, shown in a fully opened position.

As best shown in FIGS. 6 and 7, the storage space 150 of the lower level 112 and the living space 152 of the upper level 114 are not communicated. Specifically, a wall 160 extends across the lower level 112 and separates the storage space 150 from the landing area 124. Thus, the storage space 150 and corresponding loading door 116 is completely isolated from the landing area 124, the staircase 122, the living space 152 of the upper level 114 and corresponding access door 126. Such isolation or separation is particularly beneficial some applications, such as when transporting animals in the storage space 150 and having humans occupy the living space 152 on the upper level 114. The fact that the loading door 116 of the storage space 150 of the lower level 112 is arranged on a different sidewall than the access door 126 for accessing the living space 152 of the upper level 114 further contributes to increase isolation between animals and humans, and thus to guarantee safety and hygiene conditions. For instance, as best shown in FIG. 4, the loading door 116 of the present embodiment is arranged at a rear sidewall (rear wall 142) of the multipurpose trailer 100, whereas the access door 126 is arranged on a lateral sidewall of the multipurpose trailer 100.

Figure 2:
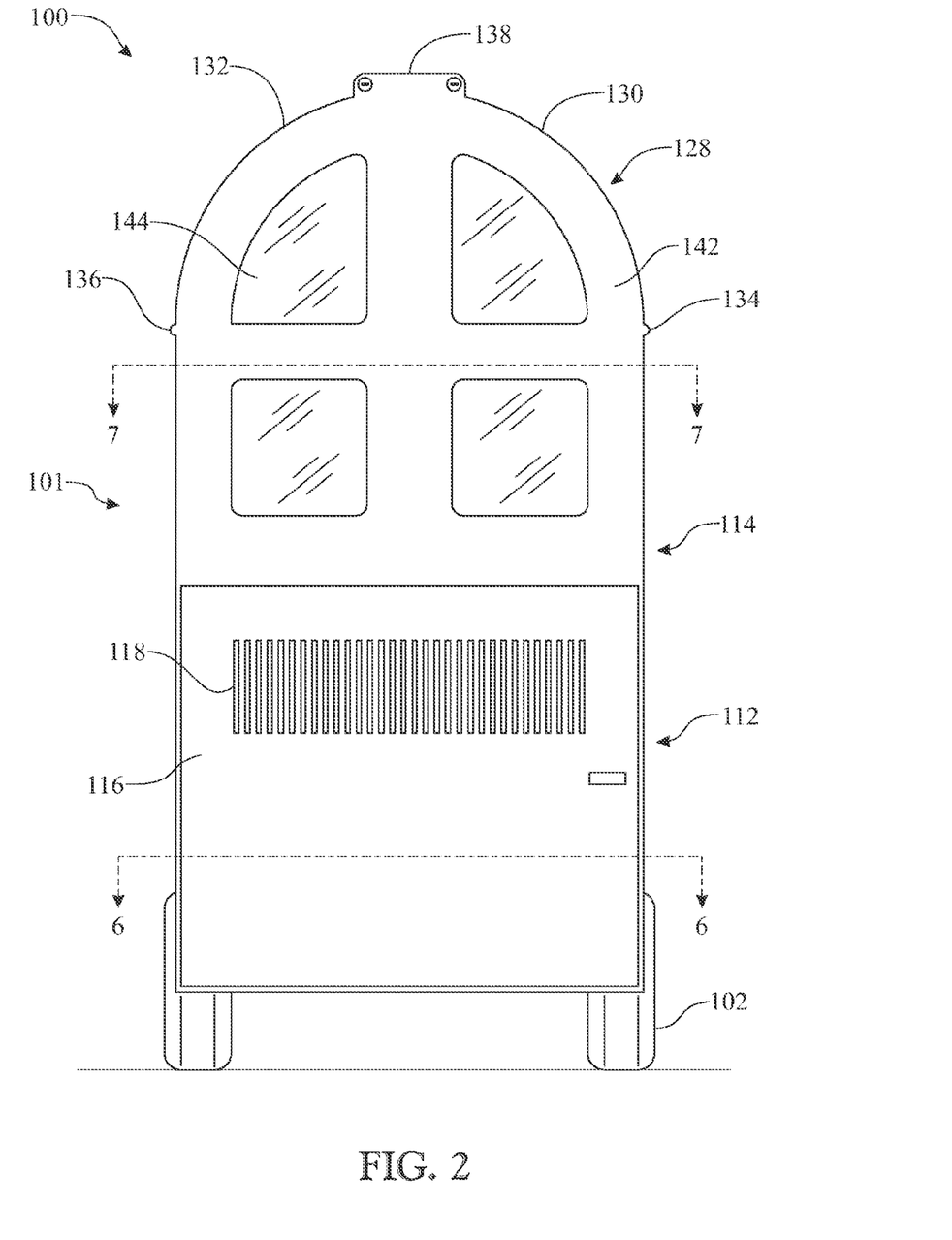
FIG. 2 presents a rear elevation view of the trailer of FIG. 1.

Turning again to FIGS. 1 and 2, the upper level 114 of the multipurpose trailer 100 includes a roof assembly 128 that is adapted and constructed to selectively open and close. The roof assembly 128 includes a pair of hinged roof sections 130, 132. As best shown in FIG. 2, the roof section 130 of roof assembly 128 is connected to a side wall of the multipurpose trailer 100 via a hinge mechanism 134. Similarly, the roof section 132 of roof assembly 128 is connected to an opposite side wall of the multipurpose trailer 100 via a hinge mechanism 136.

The roof section 130 and the roof section 132 meet along an upper central roof support section 138. As best shown in FIGS. 1 and 3, the roof support section 138 spans the longitudinal axis of the multipurpose trailer 100 from a front wall 140 to a rear wall 142. The front wall 140 and the rear wall 142 can include one or more windows 144 to provide additional light to the upper level 114. The windows 144 can optionally provide additional ventilation to the upper level 114.

A first, closed position of the roof assembly 128 is illustrated in FIGS. 1 through 3. In this position, the roof section 130 and the roof section 132 meet in sealing relation along the central roof support section 138, the front wall 140, and the rear wall 142. In addition, in this position the roof sections 130, 132 are arranged folded over the living space 152 of the upper level 114. With the roof assembly 128 in its folded position, the multipurpose trailer 100 can be transported.

Figure 5:
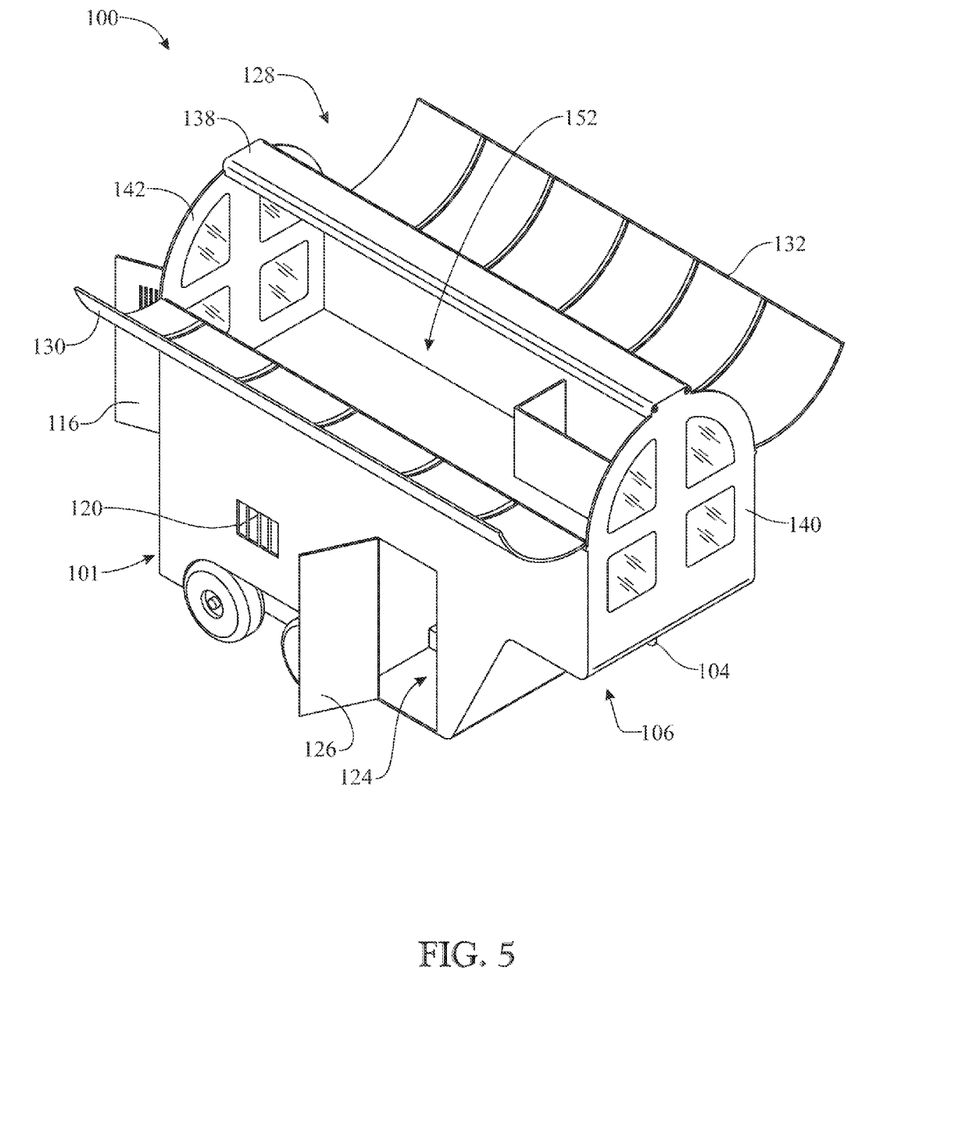
FIG. 5 presents a top front isometric view of the trailer of FIG. 4.

The roof sections 130, 132 can be jointly or separately operated to move to a second, open position in which the roof assembly 128 is open to the ambient environment, as illustrated in FIGS. 4 and 5. As shown in FIGS. 1 and 3, the roof assembly 128 is opened by causing the roof section 130 to be actuated to move in the direction of arrow A3, and the roof section 132 to be actuated to move in the direction of arrow A4. The roof assembly 128 can be provided with any suitable actuation mechanism. It is contemplated that electric systems, hydraulic systems, clamshell folding mechanisms, or manually operated mechanical systems could be used, depending on the materials used in the roof assembly 128 and the specific environment in which the multipurpose trailer 100 is to be principally used. Preferably, the actuation mechanism can be configured to selectively open roof section 130, roof section 132 or both.

The roof assembly 128 can be made of any suitable material. For example, the roof sections 130, 132 may be made entirely or partially of insect screen material, a translucent material, a transparent material, an opaque material or any combination thereof.

If the roof sections 130, 132 are made entirely of screen, the screen is generally mounted on a peripheral supporting frame as known in the art. A roof so constructed would provide occupants with the sensation of openness, even when the roof assembly 128 remained closed. Occupants would be able to see the stars, to enhance the experience of camping under cover or in bed in safety.

A roof section made entirely or partially of translucent material would allow light to pass through to the interior of the living space, while still protecting the occupants against rain, heat, and cold. Translucent material would also provide privacy.

Making the roof section entirely or partially out of a transparent material roof (such as, without limitation, glass or Poly(methyl methacrylate) (PMMA)) allows occupants to enjoy their surroundings while still providing protection against the elements.

Using an opaque roof material would provide the maximum in privacy, and would be desirable in applications where the occupants desired a light-absent experience, whether because of personal preference or due to the nature of the environment in which the trailer is being used.

It is also contemplated that the roof sections 130, 132 could be fabricated from a material that would be electrochemically variable to be transparent, translucent, or opaque. Such a material would be controlled from the living space, or via a remote control arrangement.

Amongst the many advantages of the invention, the present invention allows constructing a relatively large living space 152 without excessively increasing the total effective length of the trailer 100. Such relatively large living space 152 is achieved by having the living space 152 arranged at an upper level 144, and by having the upper level 114 extend from the back to the front of the trailer 100, and over the hitch mechanism receiving space 106. Thus, the trailer 100 of the present invention makes efficient use of the otherwise free space above the hitch mechanism 104 and hitch mechanism receiving space 106, and obtains a combined cargo/livable trailer that is convenient and less expensive to drive, park and store.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A multipurpose trailer comprising:
a trailer structure;
a wheel assembly rotatable with respect to said trailer structure;
a hitch assembly for coupling said trailer structure to a vehicle;
said trailer structure comprising:
a lower level comprising a first cargo space;
an upper level located above said lower level, the upper level comprising a second cargo space providing a living space for human occupation located above the first cargo space; and
a roof assembly connected to the upper level, the roof assembly being selectively convertible between a first, closed position in which the roof assembly is folded over said second cargo space of the upper level, and a second, open position in which the roof assembly is open communicating said second cargo space with an ambient environment of said trailer structure;
an inner access communicating the lower level with the upper level;
a landing area arranged within the trailer structure at the lower level, isolated from the first cargo space, wherein the second cargo space of the upper level is accessible from the landing area via the inner access;
a first access for entering the first cargo space of said lower level from outside said trailer structure; and
a second access for entering the landing area from outside said trailer structure, the second access separate from the first access.

2. The multipurpose trailer of claim 1, wherein said hitch assembly is arranged within a hitch mechanism receiving space arranged forward to said first cargo space of said lower level, and wherein said second cargo space of said upper level is arranged above said hitch mechanism receiving space and said first cargo space of said lower level.

3. The multipurpose trailer of claim 1, wherein said first access and said second access are arranged on different sidewalls of said trailer structure.

4. The multipurpose trailer of claim 1, wherein said landing area and said first cargo space of said lower level are isolated by an inner wall of said trailer structure.

5. The multipurpose trailer of claim 1, wherein the roof assembly is constructed at least partially from an opaque material.

6. The multipurpose trailer of claim 1, wherein said roof assembly comprises two roof sections, each roof section hinged to an opposite lateral sidewall of said trailer structure, wherein said roof sections meet along an upper longitudinal section when said roof assembly is arranged in said first, closed position.

7. The multipurpose trailer of claim 6, wherein said upper longitudinal section spans from a rear wall of said trailer structure to a front wall of said trailer structure.

8. A multipurpose trailer comprising:
a trailer structure;
a wheel assembly rotatable with respect to said trailer structure;
a hitch assembly for coupling said trailer structure to a vehicle;
said trailer structure comprising:
a lower level comprising a first cargo space;
an upper level located above said lower level, the upper level comprising a second cargo space providing a living space for human occupation located above the first cargo pace; and
a roof assembly connected to the upper level, the roof assembly being selectively convertible between a first, closed position in which the roof assembly is folded over said second cargo space of the upper level, and a second, open position in which the roof assembly is open communicating said second cargo space with an ambient environment of said trailer structure, wherein
said hitch assembly is arranged within a hitch mechanism receiving space arranged forward to said first cargo space of said lower level, and wherein said second cargo space of said upper level is arranged above said hitch mechanism receiving space and said first cargo space of said lower level; and
a first access for entering said first cargo space of said lower level from outside said trailer structure, and a second access for entering a landing area from outside said trailer structure, wherein said landing area is arranged within said trailer structure at said lower level and wherein said second cargo space of said upper level is accessible from said landing area.

9. The multipurpose trailer of claim 8, wherein said first access and said second access are arranged on different sidewalls of said trailer structure.

10. The multipurpose trailer of claim 8, wherein said landing area and said first cargo space of said lower level are isolated by an inner wall of said trailer structure.

11. The multipurpose trailer of claim 8, wherein said roof assembly comprises two roof sections, each roof section hinged to an opposite lateral sidewall of said trailer structure, wherein said roof sections meet along an upper longitudinal section when said roof assembly is arranged in said first, closed position.

12. The multipurpose trailer of claim 11, wherein said upper longitudinal section spans from a rear wall of said trailer structure to a front wall of said trailer structure.

* * * * *